United States Patent
Yeh et al.

(10) Patent No.: US 6,429,915 B1
(45) Date of Patent: Aug. 6, 2002

(54) TILTED POLARIZERS FOR LIQUID CRYSTAL DISPLAYS

(75) Inventors: Pochi Yeh, Thousand Oaks; Claire Gu, Santa Crux, both of CA (US)

(73) Assignee: Santa Barbara Photonics, Inc., Santa Barbara, CA (US)

( * ) Notice: Subject to any disclaimer, the term of this patent is extended or adjusted under 35 U.S.C. 154(b) by 0 days.

(21) Appl. No.: 09/659,135

(22) Filed: Sep. 11, 2000

(51) Int. Cl.⁷ ............................................. G02F 1/1333
(52) U.S. Cl. .................................... 349/96; 359/492
(58) Field of Search ........................... 349/96; 359/492

(56) References Cited

U.S. PATENT DOCUMENTS

| | | | | |
|---|---|---|---|---|
| 4,767,190 A | * | 8/1988 | Dir et al. ....................... | 349/96 |
| 5,493,426 A | * | 2/1996 | Johnson et al. ................ | 349/96; |
| 6,124,907 A | * | 9/2000 | Jones et al. .................... | 349/96 |

* cited by examiner

*Primary Examiner*—James A. Dudek
(74) *Attorney, Agent, or Firm*—Michael G. Petit

(57) ABSTRACT

The present invention provides a liquid crystal display apparatus and a method for viewing liquid crystal displays over a wide range of viewing angles with minimal loss in image contrast and gray level. Prior art liquid crystal displays (LCDs) exhibit low contrast and gray level inversion when viewed at large viewing angles. Prior art solutions to these problems include using a phase retardation plate or film interposed between the liquid crystal layer and a polarizer layer as an optical compensator. While such a solution improves image contrast and reduces some undesirable angular effects, the fabrication of such phase retardation compensator films requires precise thickness control and is expensive. The present invention discloses that by tilting the absorption axis of the birefringent polymer molecules comprising the polarizer sheet to orient at an appropriate angle relative to the liquid crystal image display panel, the contrast ratios and the gray level stability are substantially improved for wide angle viewing. For projection displays, absorption axis tilting (tilting) can be done by simply tilting the plane of a standard polarizer sheet relative to the plane of the LC image display. For flat panel displays, tilting can be accomplished by using a new type of sheet polarizer in which the long axis of the parallel chains of polymer molecules within the sheet are tilted relative to the physical plane occupied by the polarizer sheet and the adjacent coplanar liquid crystal layer.

6 Claims, 2 Drawing Sheets

Prior Art

(a) Convevtional Sheet Polarizer (b) Tillted Polarizer

TILTED POLARIZERS FOR LIQUID CRYSTAL DISPLAYS

BACKGROUND OF THE INVENTION

1. Field of the Invention

This invention relates to liquid crystal displays and, more particularly, to a method and apparatus for improving the contrast and gray scale of an image during wide angle viewing of a liquid crystal display.

2. Prior Art

Liquid crystal displays (LCDs) include a thin film of a liquid crystal sandwiched between two transparent sheet electrodes. The sheet electrodes commonly used are glass which is coated with a thin film of a metal or metal oxide. The thickness of the liquid crystal film is in the range of about 6–25 microns and is controlled by a spacer which is chemically inert. The cell thus formed is then hermetically sealed. The cell is then placed between crossed polarizer sheets. Polarized light, passing through one of the crossed sheet polarizers, enters the liquid crystal layer and is rotated 90 degrees as it passes through the liquid crystal layer and passes through the second (crossed) polarizer sheet. If a mirror is placed behind the second sheet polarizer, the polarized light will be reflected back through the liquid crystal layer and the first polarizer sheet and provide a white background. When a voltage is applied across the liquid crystal layer, the long axis of those liquid crystals disposed between the electrodes align in the direction of the electric field. In this orientation, the liquid crystal molecules do not rotate the polarization state of light and the display appears dark against a white background.

A "sheet polarizer" of the type referred to above is a polymeric film used for producing polarized light from unpolarized light. An example of a sheet polarizer that is commonly used for producing polarized light is a stretched sheet of a colorless polymeric film treated with an iodine solution. The most commonly used polarizer sheet includes a plurality of chains of polymer molecules such as, for example, polyvinyl alcohol (PVA), wherein each of the PVA polymer chains has a long axis which is parallel to the long axis of all other PVA chains, and containing conductive iodine atoms. In conventional liquid crystal displays (LCDs), the long (absorption) axes of the polymer chains are parallel to the plane containing the surface of the polarizer sheet. This is a result of the manufacturing process (e.g., unidirectional stretching), which leads to a uniaxial alignment of the microscopic iodine crystals in the polymer film (e.g., iodine-polyvinyl, iodine-polyvinylene). These microscopic iodine crystals are needle-like with the absorption (long) axis of the polymer chains parallel to the long axis of the needles. FIG. 1(a) shows a schematic drawing of the alignment of the microscopic iodine crystals in the polarizer.

Contrast and stability of gray scale levels are important attributes in determining the quality of a liquid crystal display. High quality (contrast, gray scale stability) information display can be obtained only within a narrow range of viewing angles centered about the normal incidence by using conventional LCDs. The narrow viewing angle has been a significant problem in advanced applications requiring high quality displays, such as avionics displays and wide-screen displays.

Yeh et al., in U.S. Pat. No. 5,196,953, the content of which patent is incorporated herein by reference thereto, discloses a means for improving the image of an LCD at large viewing angle. Yeh et al. suggest that the loss of contrast with increased viewing angle, in a normally white LCD, is, at least in part, because the homeotropic liquid crystal layer does not appear isotropic to off-normal light incident thereon. Yeh et al., in 953, suggest the addition of an optical C-plate compensator to the LCD. A C-plate compensator is a negatively uniaxial birefringent plate with its extraordinary axis (i.e., its c-axis) perpendicular to the surface of the plate. Winker et al., in U.S. Pat. No. 5,986,733, employs a positive birefringent compensator layer, oriented with its optical axis substantially parallel to the average direction of the optic axis within a central, nominally homeotropic portion of the liquid crystal layer, in its driven state, disposed between the crossed sheet polarizer layers and the liquid crystal layer being tilted with respect to the parallel planes of the crossed polarizer sheets and the compensator layer. Notwithstanding the foregoing efforts to improve the wide-angle viewability of LCDs, there remains a need for low cost LCDs having a wide viewing angle.

SUMMARY

It is an object of the invention to provide a polarizing film for use with a liquid crystal display that enables the wide-angle viewing of the image on the liquid crystal display without substantial loss of image contrast.

It is a further object of the invention to provide a method for making a liquid crystal display wherein the image on the display may be viewed over a large range of angles with minimum loss of image contrast.

The above objectives of the invention are met by employing a novel polarizer sheet in liquid crystal displays. The novel polarizer sheet is comprised of a plurality of parallel polymer chains; each chain having a long axis that is tilted with respect to a direction normal to the liquid crystal cell. In a twisted nematic LCD, the replacement of the standard analyzer polarizer sheet with a polarizer sheet wherein the polymer chains have a tilt angle of 30 degrees provides a significant improvement in the contrast ratios and gray scale stability for wide-angle viewing. Tilted polarizers can be easily implemented in projection displays by actually tilting the plane of a standard sheet polarizer relative to the plane of the LC cell. For flat panel LCD's, tilted polarizers must be fabricated by physically (or chemically, or optically) tilting the c-axis (absorption axis) of the polarizer material relative to the film surface.

The features of the invention believed to be novel are set forth with particularly in the appended claims. However the invention itself, both as to organization and method of operation, together with further objects and advantages thereof may be best be understood by reference to the following description taken in conjunction with the accompanying drawings in which:

DESCRIPTION OF THE PREFERRED EMBODIMENTS

Figure 1:
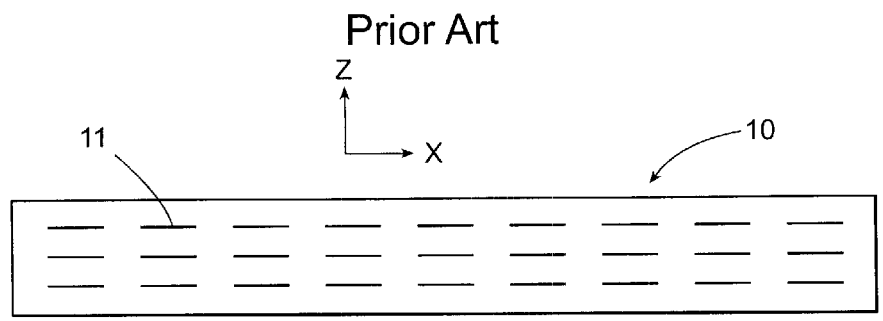
FIG. 1(a) is a side view of a conventional prior art sheet polarizer.
FIG. 1(b) is a side view of a tilted sheet polarizer in accordance with the present invention.
Figure 1:
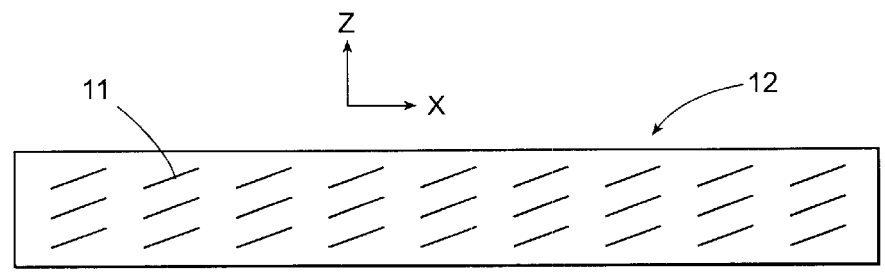

In conventional LCDs involving the use of sheet polarizers, the absorption axes of the polarizers (i.e., the long axes of the polymer chains and iodine crystals comprising the sheet polarizer) are parallel to each other and to the surface of the sheet polarizers. This is a result of the manufacturing process (e.g., uni-directional stretching), which leads to a uniaxial alignment of the microscopic iodine crystals in polymer film (e.g., iodinepolyvinyl, iodine-polyvinylene). The microscopic iodine crystals have a needle-like structure, with the absorption axis (c-axis) parallel to the long axis of the needles. FIG. 1(a) is a schematic drawing illustrating the alignment of the microscopic iodine crystals 11 in the sheet polarizer 10.

The prior art sheet polarizers 10 described above behave like optically uniaxial media with their c-axis 11 parallel to the surface of the sheet polarizers. There are two modes of propagation in optically uniaxial media: the ordinary mode (O mode) and the extraordinary mode (E mode). In most sheet polarizers (e.g., Polaroid® brand of sheet polarizers), the extraordinary mode is strongly attenuated, leading to a transmission of the ordinary mode. Thus, these polarizers are called O-type polarizers. Most commercially available sheet polarizers are O-type polarizers. In O-type polarizers, the polarization state of the transmitted optical wave is perpendicular to the absorption axis (the c-axis). In addition, the polarization state of the transmitted wave depends on the angle of incidence and the orientation of the c-axis. Thus, by tilting the c-axis (or absorption axis) of the sheet polarizer, we can control the polarization state of the transmitted wave.

For the purpose of discussion, we define the z-axis as the axis of the optical system, and the xy-plane is the plane of the flat panel. In most LCDs, the z-axis is also the direction of normal incidence (or normal viewing). In conventional LCDs, the c-axes (or absorption axes) are confined in the xy-plane. The present invention discloses tilted sheet polarizers 12 wherein the c-axes (or absorption axes) 11 have a tilt angle θ relative to the xy-plane as illustrated in FIG. 1(b). Based on the electromagnetic theory of wave propagation in anisotropic media, the polarization state of the transmitted wave at normal incidence (i.e., in a direction parallel to the Z axis), is independent of the tilt angle θ. Thus, the tilting of the polarizer 11 will not change the transmission property of the LCDs at normal incidence (normal viewing). In other words, the viewing characteristics of the LCDs at normal incidence will not change as a result of the tilt of the absorption axis of the polarizers. This is an important property of the tilted polarizers 11. We can now tilt the polarizers to change the viewing characteristics of the LCDs at large viewing angles without affecting the viewing characteristics at normal incidence. The tilt angle θ offers an additional degree of freedom in controlling the viewing angle characteristics without changing the viewing characteristics at normal incidence. Accordingly, tilt polarizers may be employed in a LCD to improve image contrast ratios and gray scale stability at large viewing angles.

Figure 2:
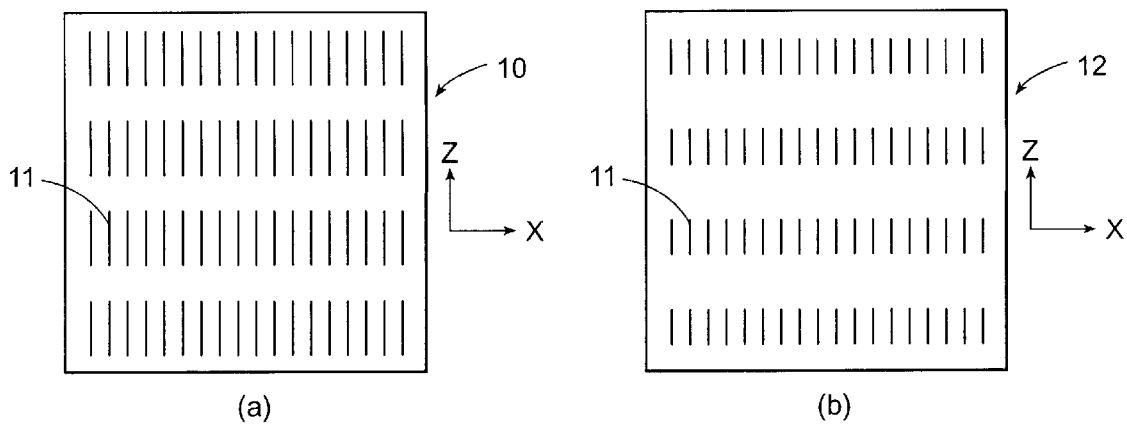
FIG. 2(a) is a schematic drawing illustrating a top view of conventional (prior art) sheet polarizer shown in FIG. 1(a).
FIG. 2(b) is a schematic drawing illustrating a top view of the tilted sheet polarizer shown in FIG. 1(b).

For the purpose of providing an example of an optical device for discussion, consider a 90-degree twisted nematic (TN) liquid crystal cell sandwiched between a pair of conventional crossed sheet polarizers of the type shown in FIGS. 1(a) and 2(a). The viewing angle characteristics of such an optical device, including contrast ratios and gray scale stability, depend strongly on the extinction property of the crossed sheet polarizers. It is known that a pair of crossed polarizers can be employed to extinguish a beam of light. This is true, however, only at normal incidence of the light beam. A leakage of light occurs at large viewing angles, even if the crossed sheet polarizers are perfect. A pair of ideal crossed sheet polarizers cannot completely extinguish a beam of light at large viewing angles. This limitation of crossed polarizers contributes to the leakage of light in dark segments of normally white LCDs. Additional sources of leakage of light include the finite extinction ratio of polarizers, and the elliptical polarization state of a light beam after passing through the LC cell. The use of tilt polarizers can be helpful for reducing, or even eliminating, the leakage of light at large viewing angles. By tilting the polarizers, we are able to orient the "effective" transmission axis of the analyzer relative to the short axis of the polarization ellipse of light at large viewing angles. This leads to an improved extinction of light.

As stated earlier, image contrast and stability of gray scale levels are important attributes in determining the quality of a liquid crystal display. High quality (contrast, gray scale stability) information display can be obtained only within a narrow range of viewing angles centered about the normal incidence by using conventional TN-LCDs. The narrowness of the viewing angle that provides an image acceptable for viewing has been a significant problem in advanced applications requiring high quality displays, such as avionics displays and wide-screen displays. Various methods of birefringent phase compensation techniques have been proposed, as discussed above, to improve the viewing angle characteristics of TN-LCDs. These include the use of c-plate negative birefringence films, negative birefringence films of dichroic compounds with inclined optical axes, and o-plate of positive birefringence. These techniques require the fabrication of thin films of uniform birefringence. The present inventors have found that a similar improvement in the wide-angle contrast ratios and gray scale stability can be obtained by simply tilting the c-axes of the sheet polarizers at an appropriate angle.

Figure 3:
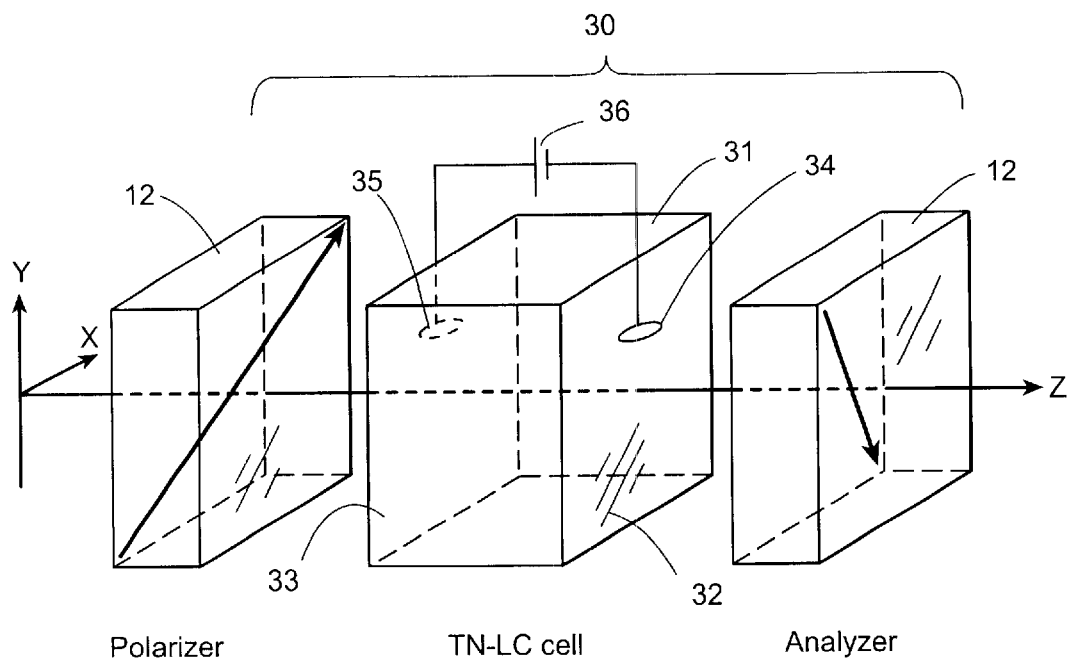
FIG. 3 is a schematic drawing of a normally white twisted numatic LCD which utilizes tilted polarizers in accordance with the present invention. The arrows in the polarizer and analyzer sheet polarizers indicate the tilt relative to the LC display panel. The dashed arrows on the twisted numatic liquid crystal cell indicate the rubbing direction.

Turning now to FIG. 3, a liquid crystal display 30 is shown illustrating the use of a pair of crossed tilted sheet polarizers 12 with a liquid crystal cell 31 disposed therebetween. Here we consider the pair of tilt polarizers 12 in a particular configuration with respect to the twisted nematic liquid crystal 31, which preserves the left-right viewing symmetry. The liquid crystal layer 31 has a first major surface 32 defining a plane and a second major surface 33 parallel to the first major surface and perpendicular to the optical axis of the device 30. A pair of electrodes 34 and 35 are disposed proximate to the first and second major surfaces respectively, and connected to a voltage source 36. As discussed earlier, the tilt of the polarizers 11 comprising the tilted sheet polarizer 12 does not change the transmission property of the LCD at normal incidence. The result of calculation using the extended Jones matrix method, indicates that the LCD shows a significant improvement in the viewing characteristics at a tilt angle of the polarizer's absorption axis of around 30 degrees. The gray scale inversion has been pushed to beyond 60-degree in the horizontal viewing. The gray scale also shows improvement in the vertical viewing.

The tilted polarizers for flat panel LCDs can be manufactured according to known techniques such as mechanical alignment, or photo-alignment with UV exposures.

However, it is possible that the tilted sheet polarizers 12 can also be manufactured by some original, and possibly not yet disclosed methods of alignment.

EXAMPLE 1

Figure 4:
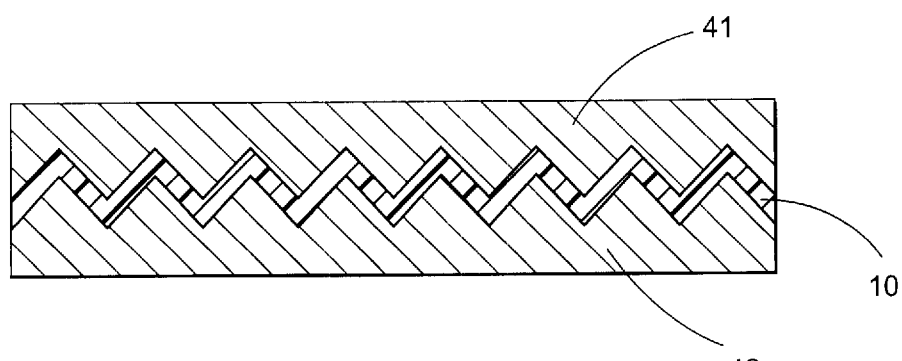
FIG. 4 is a schematic drawing illustrating a method for fabricating a tilt polarizer using a complementary sawtooth substrate and superstrate. The conventional thin film polarizer is sandwiched between the substrate and superstrate.

A simple and straightforward way of making such a tilt polarizer involves the use of sawtooth substrate and sawtooth superstrate. A conventional thin film polarizer can then be sandwiched between the substrate and superstrate. The conventional thin film polarizer will be forced into the shape of sawtooth defined by the substrate and superstrate, with the tilt angle defined by those of the substrate and superstrate. FIG. 4 illustrate a straightforward way of fabricating such tilt polarizers. The conventional thin film polarizer is sandwiched between the substrate and superstrate.

In summary, this invention describes the use of tilted polarizers in LCDs. A tilt angle of 30 degrees in typical LCDs leads to a significant improvement in the contrast ratios and gray scale stability. Tilted polarizers can be easily implemented in projection displays by actually tilting the conventional sheet polarizers relative to the plane of the LC cell. For flat panel LCDs, tilted sheet polarizers must be fabricated by physically (or chemically, or optically) tilting the c-axis (absorption axis) of the polarizer material relative to the plane defined by the tilted sheet polarizer's surface. This may require developing special fabrication techniques.

The liquid crystal device of the present invention is preferably normally white. The liquid crystal display is comprised essentially of a pair of crossed sheet polarizers, at least one of which is a tilted sheet polarizer, and a liquid crystal layer having a pair of electrodes proximate thereto sandwiched between the sheet polarizers. The first sheet polarizer has a first absorbing axis, and the second sheet polarizer has a second absorbing axis that is perpendicular to the first absorbing axis. The liquid crystal layer, preferably a twisted nematic type of liquid crystal, is disposed between the first and second sheet polarizers and has a first major surface which defines a plane, and a second major surface parallel thereto. A first electrode is disposed proximate to the first major surface of the liquid crystal layer, and a second electrode proximate to the second major surface of the liquid crystal layer. In accordance with the invention, the first sheet polarizer, and preferably the second polarizer sheet, are comprised of a plurality of elongate light absorbers having a long axis that is tilted with respect to the plane of the sheet polarizer(s). The use of such a tilted sheet polarizer in liquid crystal displays improves image contrast and gray scale at off-normal viewing angles.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What we claim is:

1. A liquid crystal display comprising:
   (a) a first sheet polarizer having a first absorbing axis;
   (b) a second sheet polarizer having a second absorbing axis;
   (c) a liquid crystal layer disposed between said first and second sheet polarizers and having a first major surface defining a plane, and a second major surface;
   (d) a first electrode proximate to said first major surface of said liquid crystal layer; and
   (e) a second electrode proximate to said second major surface of said liquid crystal layer, wherein said first sheet polarizer comprises a plurality of elongate light absorbers having a long axis sandwiched between an optically transparent superstrate having a plurality of parallel first grooves on an inner surface thereof, said inner surface of said superstrate defining a contour, and a substrate having an inner surface with a plurality of parallel second grooves thereon that are complementary to said plurality of first grooves and wherein said long axis of said elongate light absorbers conforms to said contour.

2. The liquid crystal display of claim 1 wherein said second sheet polarizer comprises a plurality of elongate light absorbers having a long axis that is tilted with respect to said plane.

3. The liquid crystal display of claim 1 wherein said liquid crystal display is normally white.

4. The liquid crystal display of claim 2 wherein said liquid crystal display is normally white.

5. The liquid crystal display of claim 1 wherein said liquid crystal display is normally black.

6. The liquid crystal display of claim 2 wherein said liquid crystal display is normally black.

\* \* \* \* \*